US006994532B2

(12) United States Patent
Vachon et al.

(10) Patent No.: US 6,994,532 B2
(45) Date of Patent: Feb. 7, 2006

(54) METHOD AND APPARATUS FOR PRESSURE MOLDING MULTI-LAYER FOOTWEAR

(75) Inventors: Luc Vachon, Saint-Luc (CA); Claude Prévost, Saint-Athanase (CA)

(73) Assignee: Sport Maska Inc., Quebec (CA)

( * ) Notice: Subject to any disclaimer, the term of this patent is extended or adjusted under 35 U.S.C. 154(b) by 326 days.

(21) Appl. No.: 09/968,649

(22) Filed: Oct. 1, 2001

(65) Prior Publication Data

US 2002/0047228 A1  Apr. 25, 2002

(30) Foreign Application Priority Data

Oct. 2, 2000  (CA) .................................. 2322343

(51) Int. Cl.
*B29C 43/02* (2006.01)
*B29D 31/50* (2006.01)

(52) U.S. Cl. ................. 425/2; 36/93; 264/DIG. 30; 425/389; 425/405.1

(58) Field of Classification Search ............... 425/2, 425/389, 387.1, 405.1; 264/314, DIG. 30; 36/93

See application file for complete search history.

(56) References Cited

U.S. PATENT DOCUMENTS

| 1,160,983 | A | * | 11/1915 | Hemenover | 425/405.1 |
| 1,337,532 | A | * | 4/1920 | Stuart | 425/389 |
| 2,114,197 | A | * | 4/1938 | Willey | 425/405.1 |
| 2,287,320 | A | * | 6/1942 | Mitchell | 425/389 |
| 2,472,754 | A | * | 6/1949 | Mead | 264/DIG. 30 |
| 2,487,965 | A | * | 11/1949 | Dresser | 264/DIG. 30 |
| 2,489,643 | A | * | 11/1949 | Hunter | 425/389 |
| 2,877,502 | A | * | 3/1959 | Murray | 264/DIG. 30 |
| 2,973,555 | A | * | 3/1961 | Schwepke | 425/215 |
| 3,362,091 | A | * | 1/1968 | Vittorio | 36/98 |
| 3,422,475 | A | * | 1/1969 | Hart | 12/145 |
| 3,613,271 | A | * | 10/1971 | Geller | 36/117.6 |
| 3,711,880 | A | * | 1/1973 | Dalebout | 12/1 R |
| 3,848,286 | A | * | 11/1974 | Kahmann | 12/142 P |
| 3,848,287 | A | | 11/1974 | Simsonen | |
| 3,962,395 | A | | 6/1976 | Hagglund | |
| 4,437,921 | A | * | 3/1984 | Bichet | 156/475 |
| 4,628,559 | A | * | 12/1986 | Funck | 12/33 |
| 4,703,532 | A | * | 11/1987 | Ciucani | 12/53.5 |
| 4,964,229 | A | | 10/1990 | Laberge | 36/93 |
| 5,152,949 | A | * | 10/1992 | Leoni et al. | 425/389 |
| 5,843,483 | A | * | 12/1998 | Theriault et al. | 425/2 |
| 6,295,679 | B1 | * | 10/2001 | Chenevert | 12/142 P |

FOREIGN PATENT DOCUMENTS

FR          2132576       11/1972

* cited by examiner

*Primary Examiner*—Robert B. Davis
(74) *Attorney, Agent, or Firm*—Factor & Lake

(57) ABSTRACT

The present invention proposes an apparatus for pressure molding multi-layer footwear for use in the field of sport footwear. The apparatus for pressure molding multi-layer footwear has two pressure forming receptacles, each having an inflatable vessel therein. The inflatable vessel is shaped and adapted to surround sides of the footwear, such as a skate. The inflatable vessel has an opening for receiving the skate and an air inlet for inflating the inflatable vessel. The apparatus may further has an air supply device connectable to a control system that will manage the airflow into the inflatable vessel to create the desired pressure onto the skate in order to provide a custom-fit skate.

11 Claims, 7 Drawing Sheets

US 6,994,532 B2

METHOD AND APPARATUS FOR PRESSURE MOLDING MULTI-LAYER FOOTWEAR

FIELD OF THE INVENTION

The present invention relates to the general art of molding footwear, but more particularly to pressure molding multi-layer footwear.

BACKGROUND OF THE INVENTION

Today, most multi-layer footwear on the market is manufactured according to a traditional process for making a shoe, i.e., thermosetting certain parts of a shoe such as a skate, and then manually gluing the component parts together. For an optimal use of these footwear, they have to be adapted to the foot of the wearer. The problem is further aggravated when the covering is rigid, as in the case of boots for skating, or downhill skiing, because it is impossible to mold a special covering adapted to the feet of each user since there are virtually never two individuals having the same morphology.

Several methods are known in the art for molding footwear to the shape of the foot of a wearer. One of these methods is disclosed in U.S. Pat. No. 4,964,229 to Laberge which describes a method and apparatus for vacuum molding multi-layer footwear, where the footwear is encased in a receptacle, which is then placed under a vacuum to apply pressure to the footwear and thus mold it to a user's foot.

However, this system, although beneficial, does suffer from some disadvantages, such as complicating an operator's involvement in the fitting session, is prone to vacuum leaks, is slow, and in some cases applies too much pressure to a user's body during the molding operation.

Therefore, there is still a need for a new molding multi-layer footwear system in order to provide a closed-fit footwear.

SUMMARY OF THE INVENTION

It is therefore an object of the present invention to provide an apparatus for pressure molding multi-layer footwear that will overcome these drawbacks.

In accordance with the present invention, that object is achieved with an apparatus for pressure molding multi-layer footwear, comprising:
 an inflatable vessel shaped and adapted to surround at least two sides of the footwear, the inflatable vessel having an opening for receiving the footwear and an air inlet for inflating said inflatable vessel to provide a pressure onto said at least two sides of the footwear; and
 a pressure forming receptacle containing the inflatable vessel.

The present invention is also directed to a method for molding multi-layer footwear to the foot of a wearer, the method comprising the steps of:
 heating the footwear to a temperature above softening temperature of components of material which form said footwear;
 wearing the footwear;
 placing the footwear into the pressure forming receptacle of the apparatus as defined above; and
 applying a pressure onto the footwear for compressing the material of said footwear against the foot of the wearer to form a custom-fit footwear.

The end result provided by the method and apparatus of the present invention essentially participates in an improved manner to mold the footwear medial and lateral support, by reducing to the minimum gaps and openings between the foot and the footwear itself. It can also, to a certain extent, shape some components of the footwear to a tight and snug fit somewhat permanently (quarter panels, vamping, etc. . . . ).

These advantages will provide better control, better energy transfer and better stability on a sport surface such as an ice-rink, which in turn will improve players performance overall (acceleration, speed, agility, crossovers, etc. . . . ). It will be apparent to a person skilled in the art that the method and system of the present invention is easily adapted to other sport footwear, non-sport footwear and potentially to other sporting activities that require a unique fit to a specific body area.

BRIEF DESCRIPTION OF THE DRAWINGS

The present invention and its advantages will be more easily understood after reading the following non-restrictive description of preferred embodiments thereof, made with reference to the following drawings in which.

DESCRIPTION OF A PREFERRED EMBODIMENT

The present invention is directed to an apparatus for pressure molding a multi-layer footwear, as shown in FIGS. 1 to 5. It will be understood that the apparatus (10) for pressure molding a multi-layer footwear according to the present invention may be used to mold a number of kinds of footwear. Such kind of footwear may be those that a close-fitting footwear is proven to be an important element. A particular advantageous kind of footwear in which the present invention may find application is in the field of sports, such as in skating and skiing since the use of a close-fitting footwear is a well known fact in ice skating (Hockey, Speed-skating, Figure-skating, etc. . . . ), roller skating (Inline, Roller-Hockey, etc. . . . ), or in downhill skiing.

Figure 2:
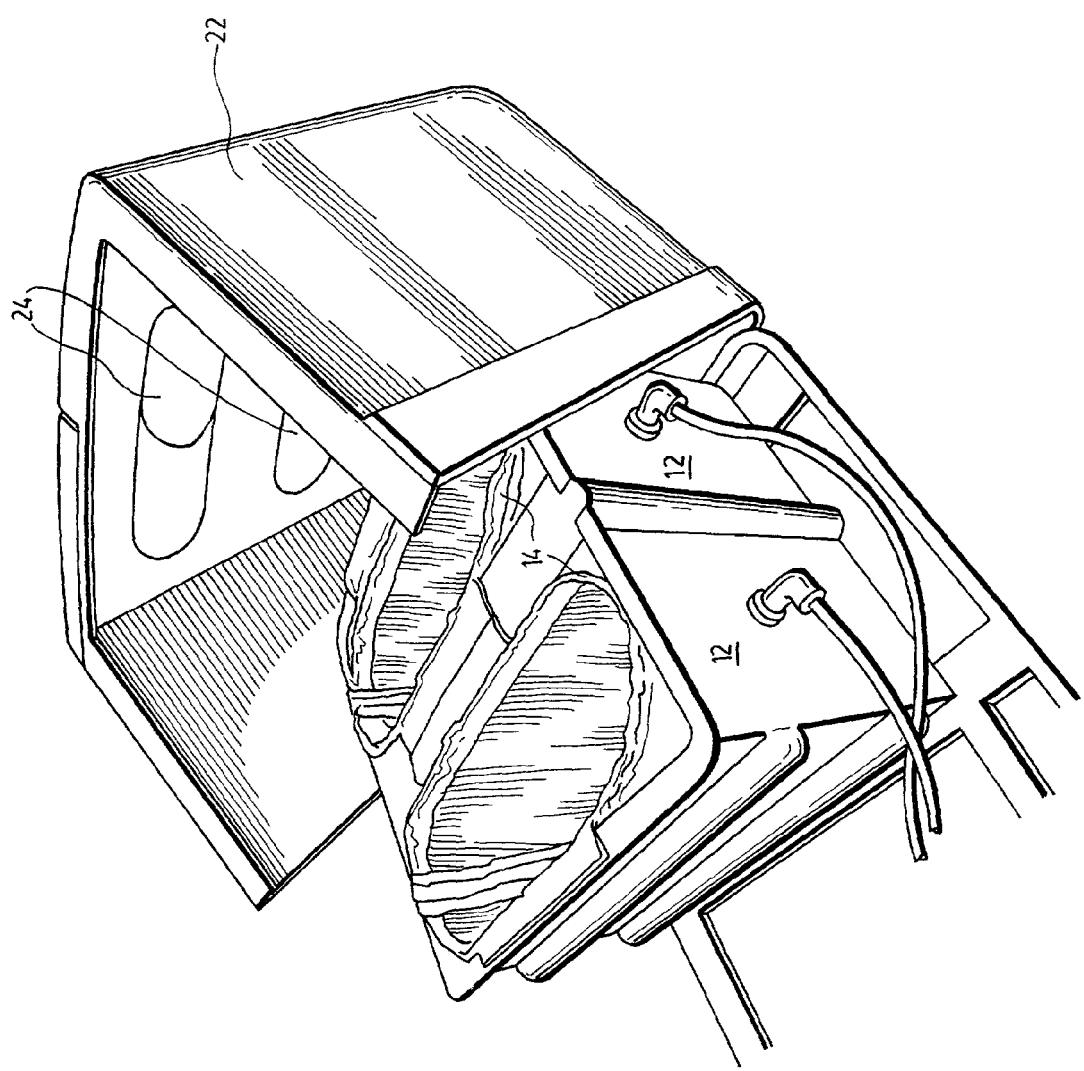
FIG. 2 is a perspective representation of a pressure forming receptacle of the apparatus of FIG. 1.
Figure 3A:
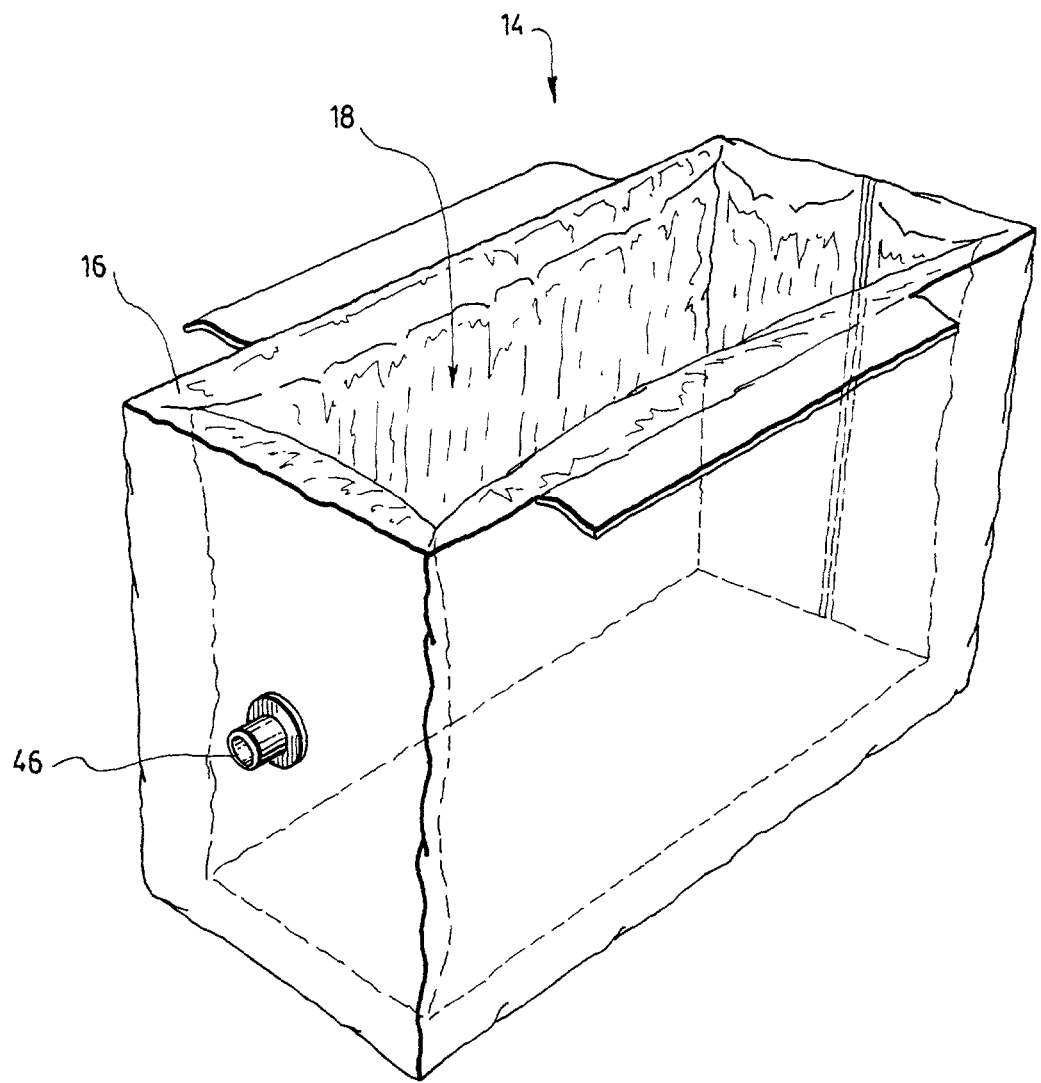
FIG. 3a is a perspective representation of an inflatable vessel at deflated configuration for use with the apparatus of the present invention.

As best shown in FIG. 2, the apparatus (10) for pressure molding multi-layer footwear comprises a pressure forming receptacle (12) which contains an inflatable vessel (14) also shown in FIG. 3a. Although, only one pressure forming receptacle (12) may suffice, the present invention prefers employing two pressure forming receptacles (12) disposed side by side. Indeed, this will allow a closed-fitting of both skates, for instance, in a single operation. Furthermore, the pressure forming receptacle (12) must be made of a material which will provide the necessary resistance to the amount of pressure used during the molding process.

Figure 3B:
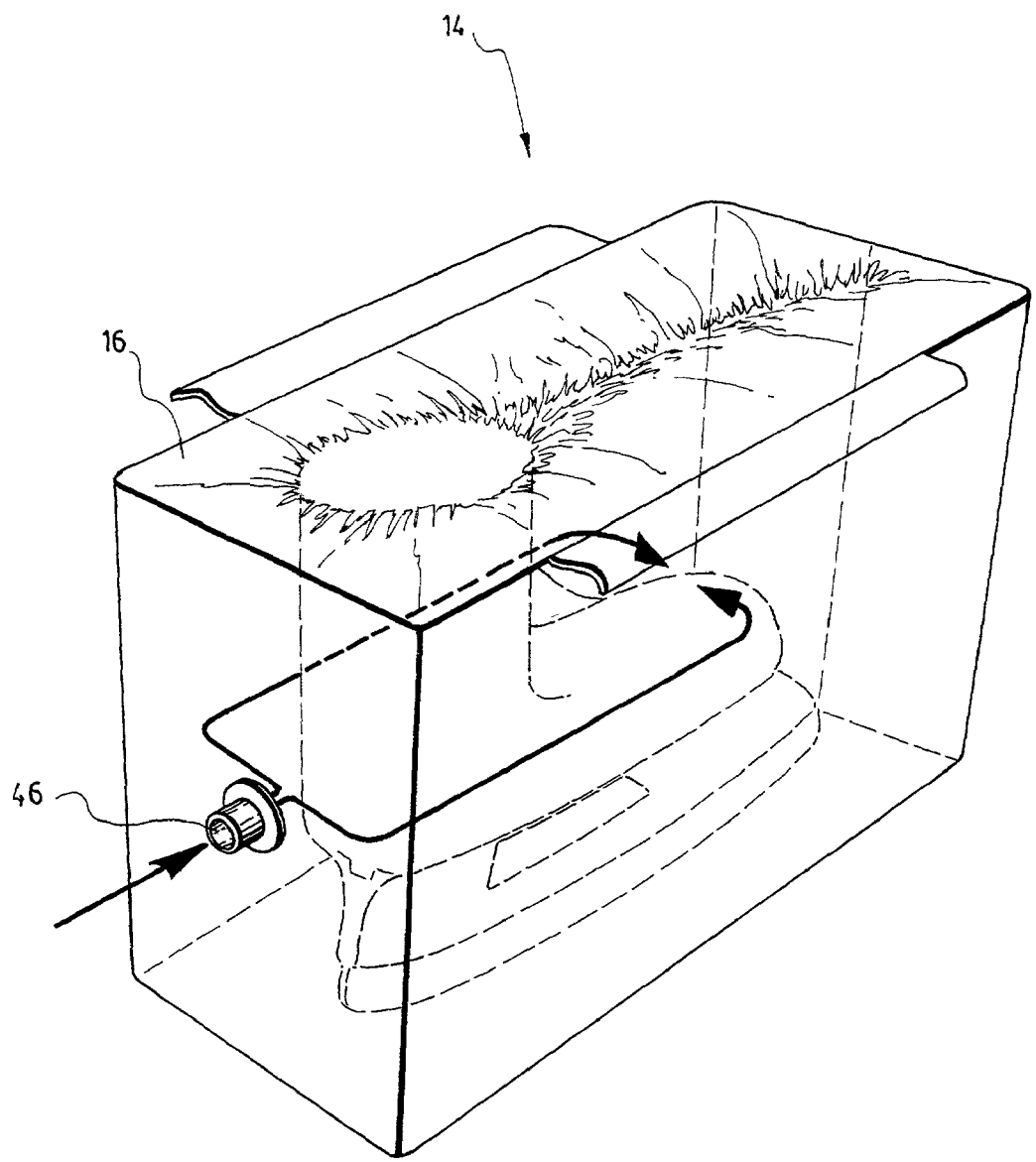
FIG. 3b is a perspective representation of the inflatable vessel of FIG. 3a at inflated configuration for use with the apparatus of the present invention.
Figure 6:
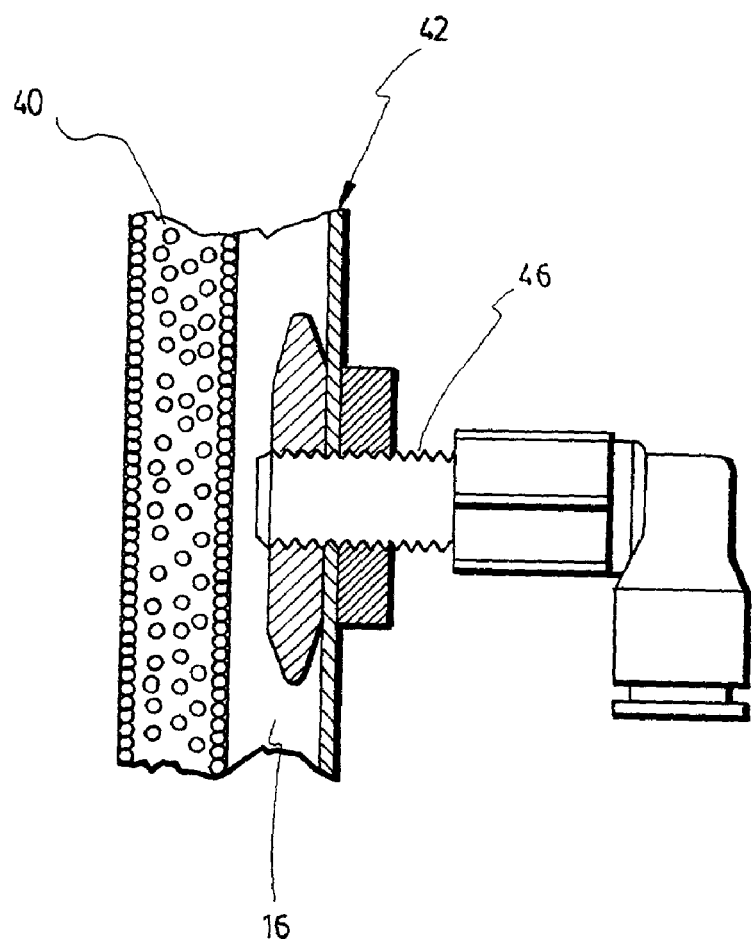
FIG. 6 is a cross-sectional view of the portion of the apparatus of FIG. 1 where the air is introduced in the inflatable vessel

As best shown in FIG. 3b, the inflatable vessel (14) is shaped and adapted to surround at least two sides of the footwear. According to a preferred embodiment, the inflatable vessel (14) comprises a single air chamber (16). It will be understood that the inflatable vessel (14) of the present invention may comprise more than one air chamber (16). In such a case, the air chambers (16) are positioned and arranged to one another and may be individually or jointly inflated. Furthermore, the inflatable vessel (14) has an opening (18) for receiving the footwear, and an air inlet (46) for inflating said inflatable vessel (14) to provide a pressure onto the two sides of the footwear. In a preferred embodiment and as shown in FIG. 6, the inside portion (40) of the inflatable vessel (14) is preferably made of an air-tight and extensible material such as neoprene of suitable thickness (for instance ⅛"). The outside portion (42) is preferably made of an air-tight and non-extensible material, such as nylon fabric. Although the inflatable vessel (14) of the present invention is preferably made of neoprene and nylon, it will be understood that the inflatable vessel (14) may be entirely made of neoprene. Furthermore, the inflatable vessel (14) preferably have a shape adapted to evenly apply pressure to all areas of the footwear. The desired pressure is preferably a pressure that will wrap, form and maintain the multi-layer footwear to the foot of the wearer during the forming pressure.

Referring back to FIG. 1, the apparatus (10) of the invention may further comprises an air supply device (20) connectable to the air inlet of the inflatable vessel (14) to inflate said inflatable vessel (14) so as to create the desired pressure onto the footwear. It will be understood that any type of air supply device (20), such as an air compressor, which can fulfil the role of feeding the control system (30) that will manage the airflow to the inflatable vessel (14) will suffice as best viewed in FIG. 4.

Figure 1:
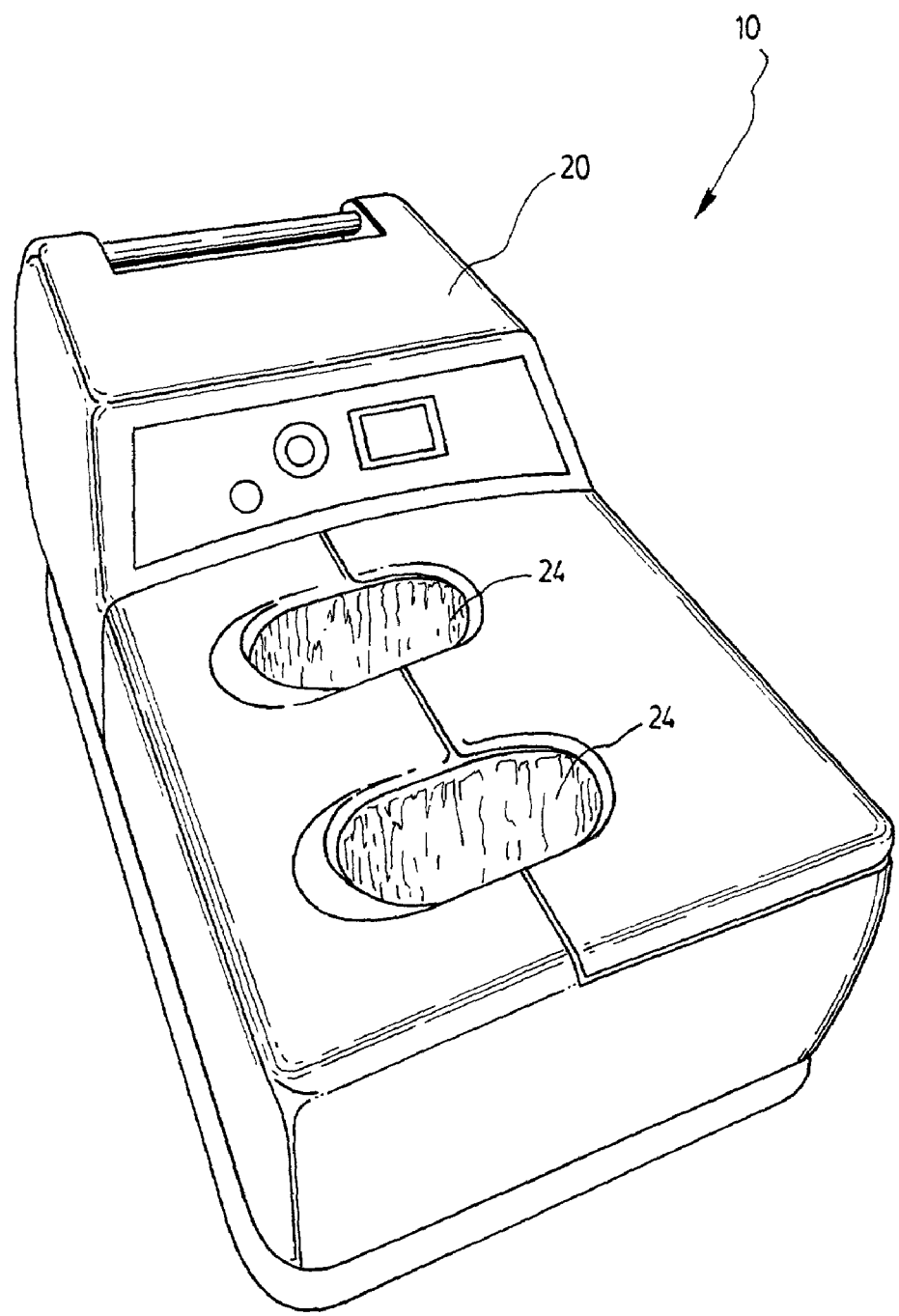
FIG. 1 is a perspective representation of the apparatus according to a preferred embodiment of the invention.
Figure 5:
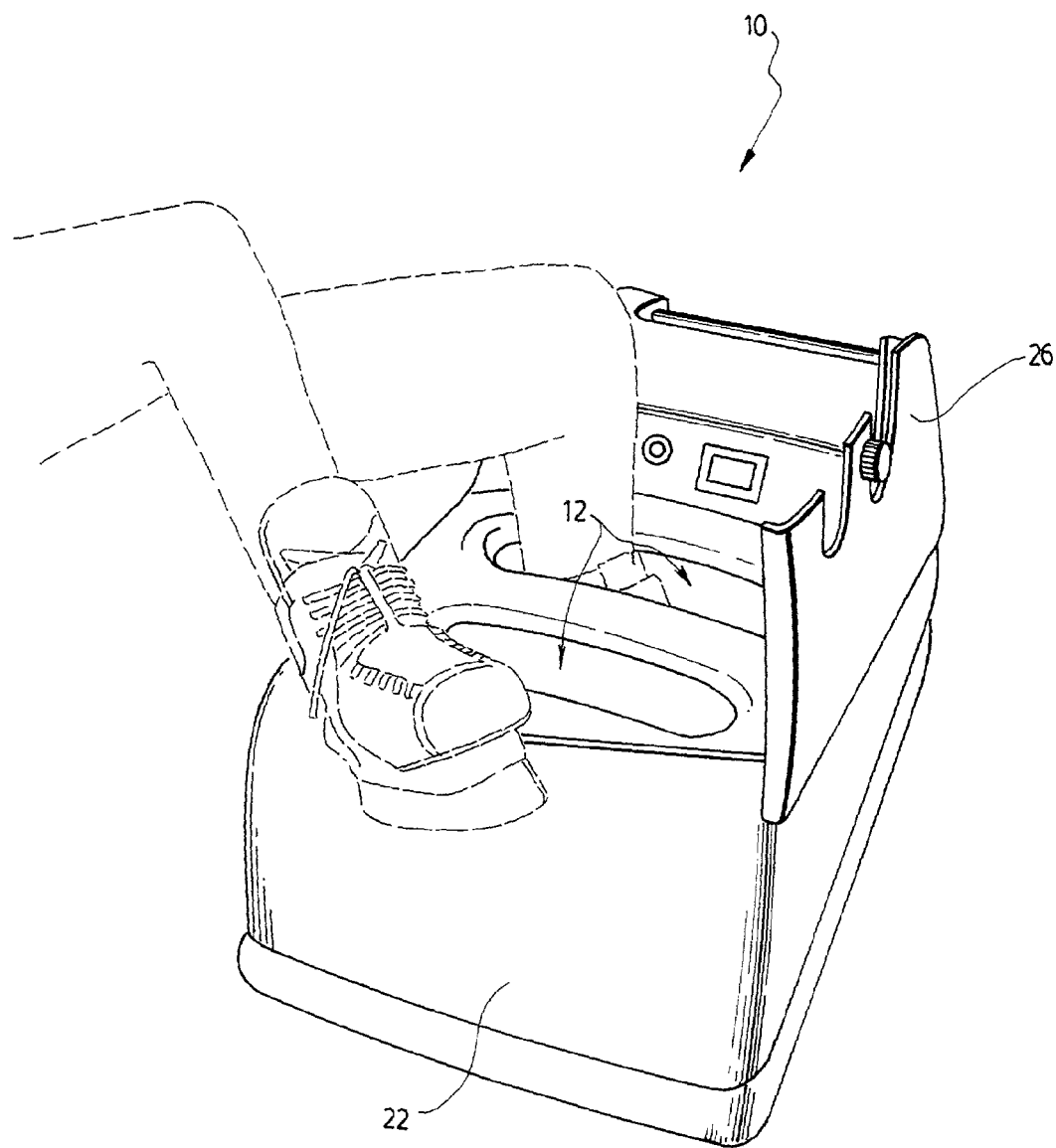
FIG. 5 is a perspective representation of the apparatus of FIG. 1 when a boot such as a skate is introduced in the pressure forming receptacle.

In a preferred embodiment and as shown in FIGS. 1, 2 and 5, the apparatus (10) preferably comprises a casing (22) in which the pressure forming receptacles (12) are defined therein. The casing (22) has an aperture (24) in connection with the opening (18) of the inflatable vessel (14). The aperture (24) is also shaped and adapted to allow easy access of the boot to the inflatable vessel (14) as best viewed in FIG. 5.

Furthermore, the casing (22) may have a safety lid (26) as shown in FIG. 5. The safety lid (26) covers a portion of the aperture (24) which is substantially an area defined between the toes and the ankle portions of the footwear.

A user-friendly interaction is provided by the control system (30), which can use pneumatic, electrical as well as electronic components to assist the operator for an easy and secure fitting session. Preferably designed in a modular way, all key components are extractable from the apparatus (10) of the present invention for servicing. Other elements could be adapted or integrated into the apparatus of the present invention to improve the overall functionality and practicality; such as addition of a seat which can either be fixed or removable from the unit, a heat source such as an oven directly built into the apparatus, a cooling system built into the apparatus, etc.

Figure 4:
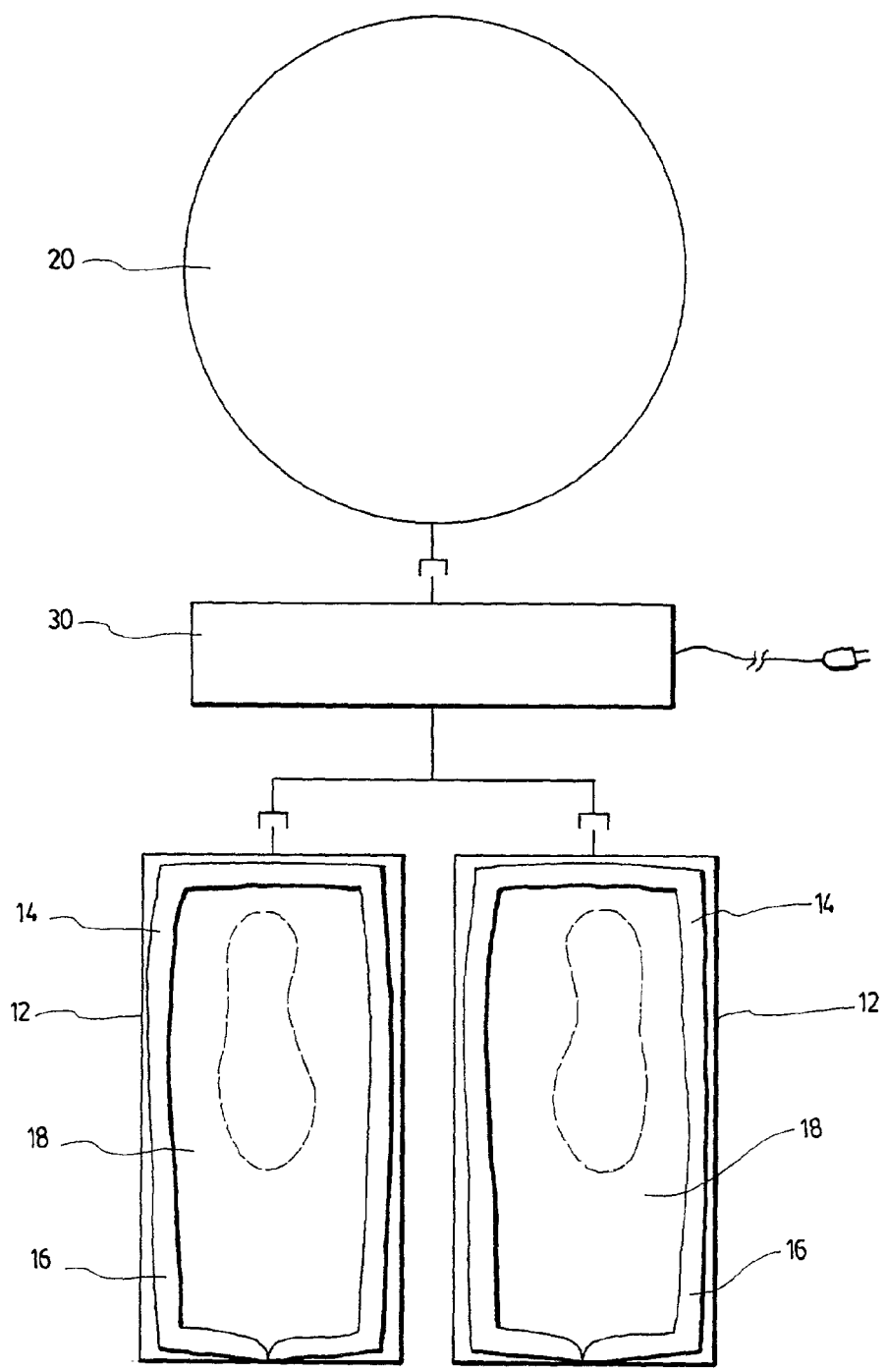
FIG. 4 is a schematic representation of the schematic layout for the system according to the present invention.

Advantageously, all components of the apparatus (10) of the present invention work simultaneously to create a controlled positive pressure reaction on the footwear at a specific period during the custom fitting process. In connection to this, a control system is preferably provided in order to control the amount of pressure or air in the inflatable vessels (14). Furthermore, the control system (30) may also control the period of time that the boot is under being compressed. Such control system is schematically shown in FIG. 4.

Preliminary steps must be followed to allow the present invention to work properly. Therefore, in order to mold the multi-layer footwear to the foot of a wearer, the footwear must be exposed to a heat source environment, such as a hot air blower, an oven or any other type of heat source known to one skilled in the art, at a temperature high enough to allow material deformation under heat and pressure. In other words, the footwear must be exposed to a temperature above softening temperature of components of material which form the footwear. Then the footwear is normally worn with careful attention to metal components that may be hot. Mechanical stress or tension should be avoided on polymeric components that could be in or near their thermo-deformation stage.

If applicable, the boot may be laced, attached or braced, and then it is introduced in the pressure forming receptacle (12) of the apparatus (10) by the apertures (24) located on the top of the casing (22), as shown in FIG. 5. These apertures (24) are large enough to allow for an adult men size boot or skate to go through and into the pressure forming receptacles (12). Within seconds of the skate introduction in the pressure forming receptacle (12), the air compressed in the reservoir or tank (20) can be transferred into the inflatable vessel (14) applying the desired pressure onto the footwear for compressing the material of the boot against the foot of the wearer to form a custom-fit footwear. More particularly, pressure build-up is allowed on the boot thus forcing the footwear quarter panels and the other heat reactive materials to comply to the individual's foot shape.

The pressurized stage is maintained during a certain period of time to allow all key materials to shape and conform to the player's foot. The foot stability obtained by the pressure while in the inflated vessel (12) along with the natural heat dissipation (passive cooling) will permit all key materials to set and solidify, thus achieving the objective of pressure molding multi-layer footwear. After this stage, the apparatus (10) of the present invention can be shut-off, and the air contained in the inflatable vessels (14) is evacuated to free the user's feet.

The benefits of the positive pressure system of the present invention over the system known in the art (negative pressure or vacuum system) currently in use are the following:

It allows a closed-fitting of both skates in a single operation.

Reduces and simplifies operator's involvement in the fitting session.

Solved the issue of vacuum leaks often associated with the prior art system.

Overall fitting operation takes less time than the prior art system.

Safer system: the end result pressures applied to the body is less than in the prior art system.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

What is claimed is:

1. An apparatus for pressure molding multi-layer footwear, comprising:
   a pressure forming receptacle;
   an inflatable vessel disposed within said pressure forming receptacle, said inflatable vessel being shaped and adapted to surround at least two sides of the footwear, said inflatable vessel comprising an air chamber made of an air-tight material;
   said air chamber comprising an internal surface having an opening and an external surface having an air inlet:
   said opening being adapted to receive said footwear therein;
   said internal surface being configured to be in contact with said footwear when said apparatus is in use; and
   said external surface being configured to be in contact with said pressure forming receptacle when said apparatus is in use.

2. The apparatus of claim 1, further comprising an air supply device connectable to the air inlet.

3. The apparatus of claim 1, further comprising a casing in which the pressure forming receptacle is defined therein, the casing having an aperture in connection with the opening of the inflatable vessel, the aperture being shaped and adapted to allow easy access of the footwear to the inflatable vessel.

4. The apparatus of claim 3, wherein the casing has a safety lid which covers at least a portion of the aperture.

5. The apparatus of claim 4, wherein the portion that is covered by the safety lid is an area defined between the toes and the ankle portions of the footwear.

6. The apparatus of claim 1, further comprising two pressure forming receptacles side by side, each pressure forming receptacles containing an inflatable vessel.

7. The apparatus of claim 1, wherein the inside portion of the inflatable vessel is made of neoprene.

8. The apparatus of claim 1, wherein the outside portion of the inflatable vessel is made of nylon fabric or neoprene.

9. The apparatus of claim 1, further comprising a heat means for heating the footwear.

10. The apparatus of claim 1, further comprising a cool means for cooling the footwear.

11. The apparatus of claim 1, further comprising a seat.

* * * * *